(12) United States Patent
Tateno et al.

(10) Patent No.: US 10,968,373 B2
(45) Date of Patent: Apr. 6, 2021

(54) EPOXY ADHESIVE COMPOSITION

(71) Applicant: SEKISUI CHEMICAL CO., LTD., Osaka (JP)

(72) Inventors: Shiori Tateno, Shiga (JP); Takayuki Maeda, Shiga (JP); Kenji Yamauchi, Yamaguchi (JP)

(73) Assignee: SEKISUI CHEMICAL CO., LTD., Osaka (JP)

(*) Notice: Subject to any disclaimer, the term of this patent is extended or adjusted under 35 U.S.C. 154(b) by 0 days.

(21) Appl. No.: 16/334,814

(22) PCT Filed: Sep. 26, 2017

(86) PCT No.: PCT/JP2017/034798
§ 371 (c)(1),
(2) Date: Mar. 20, 2019

(87) PCT Pub. No.: WO2018/062205
PCT Pub. Date: Apr. 5, 2018

(65) Prior Publication Data
US 2019/0276718 A1 Sep. 12, 2019

(30) Foreign Application Priority Data

Sep. 30, 2016 (JP) .............................. JP2016-194177
Mar. 30, 2017 (JP) .............................. JP2017-068920

(51) Int. Cl.
C09J 163/00 (2006.01)
C08L 31/04 (2006.01)
C08F 8/28 (2006.01)
C09J 129/14 (2006.01)

(52) U.S. Cl.
CPC ............... *C09J 163/00* (2013.01); *C08F 8/28* (2013.01); *C08L 31/04* (2013.01); *C09J 129/14* (2013.01); *C09J 2431/00* (2013.01)

(58) Field of Classification Search
None
See application file for complete search history.

(56) References Cited

U.S. PATENT DOCUMENTS

2003/0130435 A1* 7/2003 Tanaka ............... C08G 59/4246
525/330.3
2004/0157078 A1* 8/2004 Yoshida ............... C09D 129/14
428/524

FOREIGN PATENT DOCUMENTS

| CN | 86 1 05150    | 2/1987  |
|----|---------------|---------|
| CN | 102382581     | 3/2012  |
| EP | 0 647 660     | 4/1995  |
| JP | 59-78282      | 5/1984  |
| JP | 06-212138     | 8/1994  |
| JP | 9-157621      | 6/1997  |
| JP | 2002-517595   | 6/2002  |
| JP | 2003-198141   | 7/2003  |
| JP | 2006-290997   | 10/2006 |
| JP | 2008-531817   | 8/2008  |
| JP | 2013-110084   | 6/2013  |
| JP | 2015-108077   | 6/2015  |
| WO | 99/64529      | 12/1999 |
| WO | 2006/093949   | 9/2006  |

OTHER PUBLICATIONS

English language machine translation of JP 2013-110084 (Year: 2013).*
International Search Report dated Nov. 7, 2017 in International (PCT) Application No. PCT/JP2017/034798.
Extended European Search Report dated Mar. 31, 2020 in corresponding European Patent Application No. 17856155.1.
"Rubber Repair Technology for Agricultural Machinery", Hebei Supply and Marketing Cooperative, Hebei Institute of Chemical Technology, Nov. 1977, 1st Edition, pp. 9-10, with concise explanation.

* cited by examiner

*Primary Examiner* — Megan McCulley
(74) *Attorney, Agent, or Firm* — Wenderoth, Lind & Ponack, L.L.P.

(57) ABSTRACT

The present invention provides an epoxy adhesive composition that is excellent in compatibility and storage stability, has high strength and excellent adhesiveness, is capable of reducing occurrence of warping or peeling when used for bonding different materials, and is also excellent in impact resistance after being cured. Provided is an epoxy adhesive composition including: a modified polyvinyl acetal resin having a constitutional unit with an acid-modified group; and an epoxy resin, the epoxy adhesive composition containing an organic solvent in an amount of 10.0% by weight or less.

8 Claims, No Drawings

EPOXY ADHESIVE COMPOSITION

TECHNICAL FIELD

The present invention relates to an epoxy adhesive composition that is excellent in compatibility and storage stability, has high strength and excellent adhesiveness, is capable of reducing occurrence of warping or peeling when used for bonding different materials, and is also excellent in impact resistance after being cured.

BACKGROUND ART

Polyvinyl acetal resin is synthesized from polyvinyl alcohol as a raw material, and has an acetyl group, a hydroxyl group, and an acetal group in a side chain to show excellent toughness, adhesiveness, crosslinkability, and hygroscopicity. A variation in the ratio of side chain groups can change the resin properties. Owing to such properties, polyvinyl acetal resin is used in a wide range of applications including laminated glass interlayer films for automobiles and ceramic green sheets.

An attempt is now being made to improve resin properties and develop novel functions of polyvinyl acetal resin by introducing a functional group other than acetyl, hydroxyl, and acetal groups into a side chain of the polyvinyl acetal resin.

Polyvinyl acetal resin however has an insufficient adhesive force to metal materials. In addition, a difference in degree of shrinkage between polyvinyl acetal resin and metal materials causes warping or peeling during heat treatment for curing.

Patent Literatures 1 to 4 disclose adhesives prepared using epoxy resin. These adhesives however exert only an insufficient adhesive force to metal materials because of the insufficient strength of the resin contained.

CITATION LIST

Patent Literature

Patent Literature 1: JP 2008-531817 T
Patent Literature 2: JP 2002-517595 T
Patent Literature 3: JP 2015-108077 A
Patent Literature 4: JP H06-212138 A

SUMMARY OF INVENTION

Technical Problem

The present invention aims to provide, in consideration of the state of the art, an epoxy adhesive composition that is excellent in compatibility and storage stability, has high strength and excellent adhesiveness, is capable of reducing occurrence of warping or peeling when used for bonding different materials, and is also excellent in impact resistance after being cured.

Solution to Problem

The present invention relates to an epoxy adhesive composition including: a modified polyvinyl acetal resin having a constitutional unit with an acid-modified group; and an epoxy resin, the epoxy adhesive composition containing an organic solvent in an amount of 10.0% by weight or less.

The present invention is specifically described in the following.

As a result of intensive studies, the present inventors found out that a modified polyvinyl acetal resin having a constitutional unit with an acid-modified group can exhibit excellent crosslinkability when used together with an epoxy resin to provide a crosslinked product having sufficient strength. They also found out that such a composition used for bonding different materials has a lower degree of shrinkage to reduce warping or peeling. The present invention was thus completed.

The epoxy adhesive composition of the present invention contains a modified polyvinyl acetal resin having a constitutional unit with an acid-modified group.

Due to the incorporation of such a modified polyvinyl acetal resin, the epoxy adhesive composition also containing an epoxy resin can form a crosslinked structure between the modified polyvinyl acetal resin and the epoxy resin. The crosslinked product obtained by the crosslinking therefore has high mechanical strength and moderate elasticity. Moreover, when the epoxy adhesive composition is used for bonding different materials, curing shrinkage is made moderate to reduce warping due to a difference in degree of shrinkage of the materials or peeling of the bonded part.

The modified polyvinyl acetal resin has a constitutional unit with an acid-modified group.

Having a constitutional unit with an acid-modified group, the modified polyvinyl acetal resin has better compatibility with the epoxy resin, realizing high mechanical strength.

Examples of the acid-modified group include carboxyl, sulfonic acid, maleic acid, sulfinic acid, sulfenic acid, phosphoric acid, phosphoric acid, and amino groups, and salts thereof. Preferred among these are carboxyl groups.

The constitutional unit with an acid-modified group may be a structure in which an acid-modified group as a side chain is directly bonded to a carbon atom constituting the main chain or a structure in which an acid-modified group as a side chain is bonded to a carbon atom constituting the main chain via an alkylene group.

The constitutional unit with an acid-modified group may have a steric structure in which two acid-modified groups are bonded to the same carbon atom constituting the main chain or a steric structure in which one acid-modified group is bonded to a carbon atom constituting the main chain. Alternatively, the constitutional unit with an acid-modified group may have a steric structure in which to each of the adjacent carbon atoms constituting the main chain is bonded an acid-modified group or a steric structure in which to one of the adjacent carbon atoms constituting the main chain is bonded an acid-modified group. Preferred structure is a steric structure in which two acid-modified groups are bonded to the same carbon atom constituting the main chain or a steric structure in which to each of adjacent carbon atoms constituting the main chain is bonded an acid-modified group. Moreover, an increase in the steric hindrance can widen the network structure of a crosslinked product obtainable by combining the modified polyvinyl acetal resin and the epoxy resin. As a result, the resulting cured product has better flexibility. Accordingly, the constitutional unit with an acid-modified group more preferably has a steric structure in which two acid-modified groups are bonded to the same carbon atom constituting the main chain.

The constitutional unit with an acid-modified group may form a steric structure in which acid-modified groups are bonded to carbon atoms constituting the main chain on one side (isotactic arrangement) or a steric structure in which acid-modified groups are bonded to carbon atoms constituting the main chain at alternate positions along the chain (syndiotactic arrangement). Moreover, it may form a steric structure in which acid-modified groups are randomly bonded (atactic arrangement).

In the case where the constitutional unit with an acid-modified group has a structure in which an acid-modified group is bonded to a carbon atom constituting the main chain via an alkylene group, the alkylene group is preferably a C1-C10 alkylene group, more preferably a C1-C5 alkylene group, still more preferably a C1-C3 alkylene group.

Examples of the C1-C10 alkylene group include linear, branched, and cyclic alkylene groups.

Examples of the linear alkylene groups include methylene, vinylene, n-propylene, tetramethylene, pentamethylene, hexamethylene, octamethylene, and decamethylene groups.

Examples of the branched alkylene groups include methyl methylene, methyl ethylene, 1-methyl pentylene, and 1,4-dimethyl butylene groups.

Examples of the cyclic alkylene groups include cyclopropylene, cyclobutylene, and cyclohexylene groups. Preferred among these are linear alkylene groups, more preferred are methylene, vinylene, and n-propylene groups, and still more preferred are methylene and vinylene groups.

Examples of the constitutional unit with a carboxyl group include a constitutional unit represented by the following formula (1-1), a constitutional unit represented by the following formula (1-2), a constitutional unit represented by the following formula (1-3), and a constitutional unit represented by the following formula (1-4).

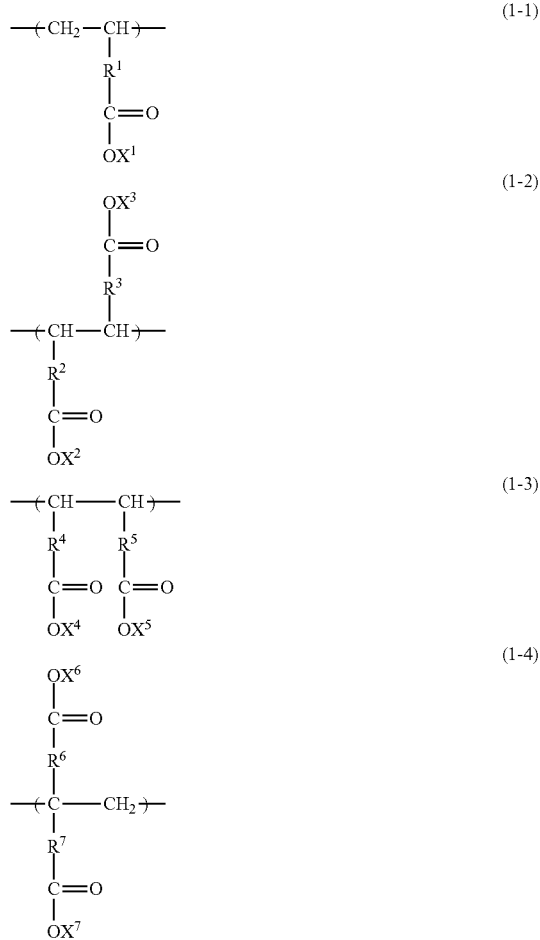

In the formula (1-1), $R^1$ represents a single bond or a C1-C10 alkylene group, and $X^1$ represents a hydrogen atom, a metal atom, or a methyl group.

$R^1$ is preferably a single bond or a C1-C5 alkylene group, more preferably a single bond or a C1-C3 alkylene group.

Examples of the C1-C10 alkylene group include linear, branched, and cyclic alkylene groups.

Examples of the linear alkylene group include methylene, vinylene, n-propylene, tetramethylene, pentamethylene, hexamethylene, octamethylene, and decamethylene groups.

Examples of the branched alkylene group include methyl methylene, methyl ethylene, 1-methyl pentylene, and 1,4-dimethyl butylene groups.

Examples of the cyclic alkylene group include cyclopropylene, cyclobutylene, and cyclohexylene groups.

Preferred among these are linear alkylene groups, more preferred are methylene, vinylene, and n-propylene groups, and still more preferred are methylene and vinylene groups.

Examples of the metal atom include sodium, lithium, and potassium atoms. Preferred among these is sodium atom.

In the formula (1-2), $R^2$ and $R^3$ each independently represent a single bond or a C1-C10 alkylene group and $X^2$ and $X^3$ each independently represent a hydrogen atom, a metal atom, or a methyl group.

Examples of the C1-C10 alkylene group include those mentioned for $R^1$ in the formula (1-1).

Examples of the metal atom include those mentioned for $X^1$ in the formula (1-1).

In the formula (1-3), $R^4$ and $R^5$ each independently represent a single bond or a C1-C10 alkylene group and $X^4$ and $X^5$ each independently represent a hydrogen atom, a metal atom, or a methyl group.

Examples of the C1-C10 alkylene group include those mentioned for $R^1$ in the formula (1-1).

Examples of the metal atom include those mentioned for $X^1$ in the formula (1-1).

In the formula (1-4), $R^6$ and $R^7$ each independently represent a single bond or a C1-C10 alkylene group and $X^6$ and $X^7$ each independently represent a hydrogen atom, a metal atom, or a methyl group.

Examples of the C1-C10 alkylene group include those mentioned for $R^1$ in the formula (1-1).

Examples of the metal atom include those mentioned for $X^1$ in the formula (1-1).

In particular, the modified polyvinyl acetal resin has a structure of preferably any of (1-2) to (1-4), more preferably (1-4) because the steric hindrance is increased and the network structure of a crosslinked structure formed between the modified polyvinyl acetal resin and the epoxy resin is widened to further improve the impact resistance of the resulting cured product.

In the modified polyvinyl acetal resin of the present invention, the acid-modified group may be directly bonded to a carbon atom constituting the main chain of the modified polyvinyl acetal resin or bonded to a carbon atom via a linking group such as an alkylene group.

The modified polyvinyl acetal resin may have the constitutional unit having an acid-modified group in a side chain.

In the modified polyvinyl acetal resin, the lower limit of the amount of the constitutional unit with an acid-modified group is 0.01 mol % and the upper limit thereof is preferably 5.0 mol %.

When the amount of the constitutional unit with an acid-modified group is 0.01 mol % or more, the modified polyvinyl acetal resin shows excellent curability with an epoxy resin. When the amount of the constitutional unit with an acid-modified group is 5.0 mol % or less, the storage stability can be improved. The lower limit of the amount of the constitutional unit with an acid-modified group is more preferably 0.05 mol % and the upper limit thereof is more preferably 3.0 mol %. The amount of the constitutional unit with an acid-modified group can be measured by NMR.

The modified polyvinyl acetal resin has a constitutional unit with an acetal group represented by the following formula (2-1), a constitutional unit with a hydroxyl group represented by the following formula (2-2), and a constitutional unit with an acetyl group represented by the following formula (2-3).

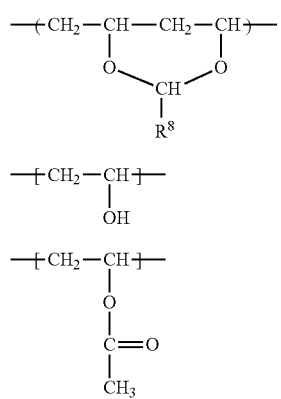

In the formula (2-1), $R^8$ represents a hydrogen atom or a C1-C20 alkyl group.

$R^8$ is preferably a hydrogen atom or a C1-C12 alkyl group.

Examples of the C1-C20 alkyl group include methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl groups. Preferred among these are methyl, ethyl, and propyl groups.

In the modified polyvinyl acetal resin, the lower limit of the amount of the constitutional unit with an acetal group (hereafter, also referred to as acetal group content) is preferably 60 mol % and the upper limit thereof is preferably 90 mol %. When the acetal group content is 60 mol % or more, the modified polyvinyl acetal resin can be sufficiently precipitated in the synthesis process by a precipitation method. When the acetal group content is 90 mol % or less, the compatibility with an epoxy resin is enhanced. The lower limit of the acetal group content is more preferably 65 mol % and the upper limit thereof is more preferably 85 mol %.

The ratio between the acetacetal group content and the butyral group content in the modified polyvinyl acetal resin is preferably 3:7 to 10:0, more preferably 7:3 to 10:0.

The lower limit of the amount of the constitutional unit with a hydroxyl group (hereafter, also referred to as a hydroxyl group content) in the modified polyvinyl acetal resin is preferably 15 mol % and the upper limit thereof is preferably 35 mol %. When the hydroxyl group content is 15 mol % or more, the toughness of the modified polyvinyl acetal resin is sufficiently high, leading to favorable strength of the resulting crosslinked product. When the hydroxyl group content is 35 mol % or less, the polarity of the modified polyvinyl acetal resin is not too high, so that troubles such as cracking in the resulting crosslinked product are reduced, and peeling properties are favorable. The lower limit of the hydroxyl group content is more preferably 17 mol % and the upper limit thereof is more preferably 30 mol %.

The lower limit of the amount of the constitutional unit with an acetyl group (hereafter, also referred to as an acetyl group content) in the modified polyvinyl acetal resin is preferably 0.0001 mol % and the upper limit thereof is preferably 15 mol %.

The average degree of polymerization of the modified polyvinyl acetal resin is not particularly limited. The lower limit thereof is preferably 150 and the upper limit thereof is preferably 4,500. When the degree of polymerization of the modified polyvinyl acetal resin is 150 or more, the resulting epoxy adhesive composition has sufficient viscosity. When the degree of polymerization of the modified polyvinyl acetal resin is 4,500 or less, the application properties of the resulting epoxy adhesive composition is favorable in the use where the composition is applied, resulting in better handleability. Moreover, the adhesive force is further improved.

The lower limit of the average degree of polymerization is more preferably 200 and the upper limit thereof is more preferably 4,000.

Examples of the method of producing the modified polyvinyl acetal resin include a method of acetalizing, by a conventionally known method, polyvinyl alcohol obtained by saponification of polyvinyl acetate that is prepared by copolymerization of a monomer having an acid-modified group and vinyl acetate. An acid-modified group may be introduced by post modification of a polyvinyl acetal resin that is prepared by acetalizing, by a conventionally known method, unmodified polyvinyl alcohol.

In other words, the modified polyvinyl acetal resin may be an acetalization product of polyvinyl alcohol having an acid-modified group or an acetalization product of unmodified polyvinyl alcohol to which an acid-modified group is introduced.

Examples of the monomer having an acid-modified group include monocarboxylic acids such as acrylic acid, crotonic acid, methacrylic acid, and oleic acid, dicarboxylic acids such as methylene malonic acid, itaconic acid, 2-methylene glutaric acid, 2-methylene adipic acid, and 2-methylene sebacic acid, maleic anhydride, and salts of these.

The acetalization may be carried out by a known method, and is preferably carried out in a water solvent, a solvent mixture containing water and an organic solvent compatible with water, or an organic solvent.

The organic solvent compatible with water may be, for example, an alcoholic organic solvent.

Examples of the organic solvent include alcoholic organic solvents, aromatic organic solvents, aliphatic ester solvents, ketone solvents, lower paraffin solvents, ether solvents, and amine solvents.

Examples of the alcoholic organic solvents include methanol, ethanol, n-propanol, isopropanol, n-butanol, and tert-butanol.

Examples of the aromatic organic solvent include xylene, toluene, ethyl benzene, and methyl benzoate.

Examples of the aliphatic ester solvents include methyl acetate, ethyl acetate, butyl acetate, methyl propionate, ethyl propionate, methyl butyrate, ethyl butyrate, methyl acetoacetate, and ethyl acetoacetate.

Examples of the ketone solvents include acetone, methyl ethyl ketone, methyl isobutyl ketone, cyclohexanone, methyl cyclohexanone, benzophenone, and acetophenone.

Examples of the lower paraffin solvents include hexane, pentane, octane, cyclohexane, and decane.

Examples of the ether solvents include diethyl ether, tetrahydrofuran, ethylene glycol dimethyl ether, ethylene glycol diethyl ether, and propylene glycol diethyl ether.

Examples of the amide solvents include N,N-dimethylformamide, N,N-dimethylacetamide, N-methylpyrrolidone, and acetanilide.

Examples of the amine solvents include ammonia, trimethylamine, triethylamine, n-butylamine, di-n-butylamine, tri-n-butylamine, aniline, N-methylaniline, N,N-dimethylaniline, and pyridine.

These may be used alone or in admixture of two or more thereof. From the standpoint of solubility in resin and easy purification, particularly preferred among these are ethanol, n-propanol, isopropanol, and tetrahydrofuran.

The acetalization is preferably carried out in the presence of an acid catalyst.

The acid catalyst is not particularly limited, and examples thereof include mineral acids such as sulfuric acid, hydrochloric acid, nitric acid, and phosphoric acid, carboxylic acids such as formic acid, acetic acid, and propionic acid, and sulfonic acids such as methanesulfonic acid, ethanesulfonic acid, benzenesulfonic acid, and p-toluene sulfonic acid. These acid catalysts may be used alone, or two or more types of compounds may be used in combination. Preferred among these are hydrochloric acid, nitric acid, and sulfuric acid, and particularly preferred is hydrochloric acid.

The aldehyde used for the acetalization may be an aldehyde having a C1-C10 chain aliphatic group, a C1-C10 cyclic aliphatic group, or a C1-C10 aromatic group. The aldehyde used may be a conventionally known aldehyde. The aldehyde used for the acetalization is not particularly limited, and examples thereof include aliphatic aldehydes and aromatic aldehydes.

Examples of the aliphatic aldehydes include formaldehyde, acetaldehyde, propionaldehyde, n-butyraldehyde, isobutyraldehyde, n-valeraldehyde, n-hexylaldehyde, 2-ethylbutyraldehyde, 2-ethylhexylaldehyde, n-heptylaldehyde, n-octylaldehyde, n-nonylaldehyde, n-decylaldehyde, and amylaldehyde.

Examples of the aromatic aldehydes include benzaldehyde, cinnamaldehyde, 2-methylbenzaldehyde, 3-methylbenzaldehyde, 4-methylbenzaldehyde, p-hydroxybenzaldehyde, m-hydroxybenzaldehyde, phenylacetaldehyde, and β-phenylpropionaldehyde.

These aldehydes may be used alone, or two or more types thereof may be used in combination. Preferred among these aldehydes are formaldehyde, acetaldehyde, butyraldehyde, 2-ethylhexylaldehyde, and n-nonylaldehyde because they are excellent in acetalization reactivity and can give a sufficient internal plasticization effect to the resin to be prepared to impart favorable flexibility. More preferred are formaldehyde, acetaldehyde, and butyraldehyde because they can provide an adhesive composition particularly excellent in impact resistance and adhesiveness to metal.

The amount of the aldehyde can be appropriately determined in accordance with the acetal group content of the aimed modified polyvinyl acetal resin. The amount of the aldehyde may be appropriately determined in accordance with the acetal group content of the aimed modified polyvinyl acetal resin. In particular, the amount is preferably 60 to 95 mol %, more preferably 65 to 90 mol % relative to 100 mol % of the polyvinyl alcohol because the acetalization reaction can be carried out efficiently and an unreacted aldehyde is easily removable.

In the epoxy adhesive composition of the present invention, the lower limit of the amount of the modified polyvinyl acetal resin is preferably 0.5% by weight and the upper limit thereof is preferably 50% by weight.

When the amount of the modified polyvinyl acetal resin is 0.5% by weight or more, high toughness can be exhibited when the epoxy adhesive composition of the present invention is used as an adhesive. When the amount is 50% by weight or less, high adhesiveness can be exhibited.

The lower limit of the amount of the modified polyvinyl acetal resin is more preferably 1.0% by weight, still more preferably 10% by weight and the upper limit thereof is more preferably 40% by weight, still more preferably 30% by weight.

The epoxy adhesive composition of the present invention contains an epoxy resin.

Due to the incorporation of the epoxy resin, the epoxy adhesive composition can be crosslinked by application of energy by heating or the like to achieve high adhesiveness.

Examples of the epoxy resins include aromatic epoxy resins, heterocyclic epoxy resins, and aliphatic epoxy resins.

Examples of the aromatic epoxy resins include glycidyl ethers and glycidyl esters of polyphenols and glycidyl aromatic polyamines.

Examples of the glycidyl ethers of polyphenols include bisphenol A-type epoxy resins, bisphenol F-type epoxy resins, and phenol novolac-type epoxy resins.

Examples of the glycidyl esters of polyphenols include diglycidyl phthalate, diglycidyl isophthalate, and diglycidyl terephthalate.

Examples of the glycidyl aromatic polyamines include N,N-diglycidyl aniline, N,N,N',N'-tetraglycidyl xylylenediamine, and N,N,N',N'-tetraglycidyl diphenylmethane diamine.

Examples of the heterocyclic epoxy resins include triglycidyl isocyanate and triglycidyl melamine.

Examples of the aliphatic epoxy resins include glycidyl ethers of aliphatic alcohols and glycidyl esters of polyvalent fatty acids.

Examples of the glycidyl ethers of aliphatic alcohols include butyl glycidyl ether, lauryl glycidyl ether, neopentyl glycol diglycidyl ether, and polypropylene glycol diglycidyl ether.

Examples of the glycidyl esters of polyvalent fatty acids include diglycidyl oxalate, diglycidyl maleate, diglycidyl succinate, diglycidyl glutarate, diglycidyl adipate, and diglycidyl pimelate.

One type of the epoxy resin may be used alone or two or more types thereof may be used in combination. From the standpoint of improving the adhesive force, an aromatic epoxy resin is preferably used among these epoxy resins, and a combination of an aromatic epoxy resin and an aliphatic epoxy resin is more preferably used.

The lower limit of the epoxy equivalent (molecular weight per epoxy group) of the epoxy resin is preferably 90 and the upper limit thereof is preferably 700.

When the epoxy equivalent is equal to or more than the preferable lower limit, curing failure is not likely to occur, leading to sufficient improvement of the mechanical strength. When the epoxy equivalent is equal to or less than the preferable upper limit, the molecular weight between crosslinking points is lowered, leading to improvement of heat resistance.

The lower limit of the epoxy equivalent is more preferably 100 and the upper limit thereof is more preferably 600.

The lower limit of the molecular weight of the epoxy resin is preferably 100 and the upper limit thereof is preferably 5,500.

When the molecular weight is 100 or more, the mechanical strength and heat resistance of the crosslinked product can be sufficiently improved. When the molecular weight is 5,500 or less, the crosslinked product is not too rigid and has sufficient strength.

The molecular weight is more preferably 200 to 1,000.

In the epoxy adhesive composition of the present invention, the lower limit of the amount of the epoxy resin is preferably 0.5% by weight, and the upper limit thereof is preferably 99.5% by weight.

With the amount of the epoxy resin of 0.5% by weight or more, the adhesiveness of the epoxy adhesive composition can be further enhanced. With the amount of the epoxy resin of 99.5% by weight or less, the toughness of the epoxy adhesive composition can be improved.

The lower limit of the amount of the epoxy resin is more preferably 1.0% by weight, and the upper limit thereof is more preferably 90.0% by weight.

In the epoxy adhesive composition of the present invention, the lower limit of the amount of the modified polyvinyl acetal resin is preferably 0.5 parts by weight, and the upper limit thereof is preferably 100 parts by weight, relative to 100 parts by weight of the epoxy resin.

With the amount of the modified polyvinyl acetal resin of 0.5 parts by weight or more, the epoxy adhesive composition can have sufficient toughness. With the amount of the modified polyvinyl acetal resin of 100 parts by weight or less, the epoxy adhesive composition can have sufficient adhesiveness.

The lower limit of the amount of the modified polyvinyl acetal resin is more preferably 1.0 part by weight and the upper limit thereof is more preferably 80 parts by weight.

In the epoxy adhesive composition of the present invention, the lower limit of the ratio between the number of acid-modified groups in the modified polyvinyl acetal resin and the number of epoxy groups in the epoxy resin (number of acid-modified groups/number of epoxy groups) is preferably 0.0005 and the upper limit thereof is preferably 0.5.

The lower limit is more preferably 0.00075, still more preferably 0.001 and the upper limit is more preferably 0.25, still more preferably 0.05.

When the ratio between the number of acid-modified groups and the number of epoxy groups is equal to or more than the lower limit and equal to or less than the upper limit, the cured product of the resulting epoxy adhesive composition has better impact resistance.

In the epoxy adhesive composition of the present invention, the amount of the organic solvent is 10.0% by weight or less and is preferably 0% by weight.

When the amount of the organic solvent is 10.0% by weight or less, curing inhibition is not likely to occur.

Examples of the organic solvent include various conventionally known organic solvents such as alcohols, ketones, acetic acid esters, and aromatic hydrocarbons, as well as dimethylformamide, dimethylacetamide, and N-methylpyrrolidone.

Examples of the alcohols include methanol, ethanol, and isopropyl alcohol.

Examples of the ketones include acetone, methyl ethyl ketone, and cyclohexanone.

Examples of the acetic acid esters include ethyl acetate, butyl acetate, cellosolve acetate, propylene glycol monomethyl ether acetate, and carbitol acetate.

Examples of the carbitols include cellosolves such as cellosolve and butyl cellosolve, carbitol, and butyl carbitol.

Examples of the aromatic hydrocarbons include toluene and xylene.

The epoxy adhesive composition of the present invention may further contain a crosslinking agent in addition to the modified polyvinyl acetal resin and the epoxy resin.

Examples of the crosslinking agent include halohydrin compounds, halogen compounds, isocyanate compounds, bisacrylamide compounds, urea compounds, guanidine compounds, dicarboxylic acid compounds, unsaturated carboxylic acid compounds, unsaturated carboxylic acid ester compounds, and aldehyde compounds.

Examples of the halohydrin compounds include epichlorohydrin and epibromohydrin.

Examples of the halogen compounds include 1,2-dichloroethane and 1,3-dichloropropane.

Examples of the isocyanate compounds include hexamethylenediisocyanate.

Examples of the bisacrylamide compounds include N,N'-methylenebisacrylamide and N,N'-ethylenebisacrylamide.

Examples of the urea compounds include urea and thiourea.

Examples of the guanidine compounds include guanidine and diguanide.

Examples of the dicarboxylic acid compounds include oxalic acid and adipic acid.

Examples of the unsaturated carboxylic acid compounds include acrylic acid and methacrylic acid.

Examples of the unsaturated carboxylic acid ester compounds include methyl acrylate, methyl methacrylate, 2-ethylhexyl acrylate, isobutyl acrylate, butyl acrylate, 2-ethylhexyl methacrylate, isobutyl methacrylate, and butyl methacrylate.

Examples of the aldehyde compounds include dialdehydes such as glyoxal, glutaraldehyde, malonaldehyde, succinaldehyde, adipaldehyde, phthalaldehyde, isophthalaldehyde, and terephthalaldehyde.

These may be used alone or in combination of two or more thereof. These crosslinking agents may be optionally dissolved in water or an organic solvent such as alcohol before use.

The epoxy adhesive composition of the present invention may further contain a curing agent and a curing accelerator.

Examples of the curing agent include dicyandiamide, imidazole compounds, aromatic amine compounds, phenol novolac resins, and cresol novolac resins. Preferred among these is dicyandiamide.

Examples of the curing accelerator include imidazole compounds, phosphorus compounds, amine compounds, and organic metal compounds. Preferred among these are imidazole compounds.

The lower limit of the amount of the curing agent in the epoxy adhesive composition of the present invention is preferably 0.5 parts by weight, more preferably 1.0 part by weight and the upper limit thereof is preferably 100 parts by weight, more preferably 50 parts by weight, relative to 100 parts by weight of the epoxy resin.

The lower limit of the amount of the curing accelerator in the epoxy adhesive composition of the present invention is preferably 0.5 parts by weight, more preferably 1.0 part by weight and the upper limit thereof is preferably 30 parts by weight, more preferably 10 parts by weight, relative to 100 parts by weight of the epoxy resin.

In the epoxy adhesive composition of the present invention, the lower limit of the ratio between the amount of the curing agent and the amount of the curing accelerator (amount of the curing agent/amount of the curing accelerator) is preferably 1/18, more preferably 1/8 and the upper limit thereof is preferably 1/0.05, more preferably 1/0.125.

The epoxy adhesive composition of the present invention may contain additives such as a plasticizer and a dispersant within a range that the effects of the present invention are not impaired.

As the method of crosslinking the epoxy adhesive composition of the present invention, a method by heating can be mentioned. In the case of thermally curing the epoxy adhesive composition by heating, the heating temperature is not particularly limited and is preferably 50° C. to 170° C. With the heating temperature of 50° C. or higher, crosslinking can proceed sufficiently to give favorable strength. With the heating temperature of 170° C. or lower, the modified polyvinyl acetal resin is not thermally degraded to show its properties sufficiently. The lower limit of the heating temperature is more preferably 60° C. and the upper limit thereof is more preferably 150° C.

Though not particularly limited, the lower limit of the heating time is preferably 5 minutes and the upper limit thereof is preferably 10 hours. With the heating time of 5 minutes or longer, crosslinking can proceed sufficiently to give sufficient strength. With the heating time of 10 hours or shorter, the modified polyvinyl acetal resin is not thermally degraded to show its properties sufficiently.

The epoxy adhesive composition of the present invention can be suitably used for applications in which conventional polyvinyl acetal resins have been used. For example, it can be used to obtain coating solutions for producing ceramic molded articles, metal pastes, heat-developing photosensitive materials, coating materials, ink, and reflective sheets. The epoxy adhesive composition of the present invention can be also used as an adhesive such as an adhesive for films used in display devices, an interlayer adhesive for ceramic laminates, and a structural adhesive for automobiles and buildings.

Advantageous Effects of Invention

The present invention can provide an epoxy adhesive composition that is excellent in compatibility and storage stability, has high strength and excellent adhesiveness, is excellent in adhesion, is capable of reducing occurrence of warping or peeling when used for bonding different materials, and is also excellent in impact resistance after being cured.

DESCRIPTION OF EMBODIMENTS

The present invention is more specifically described in the following with reference to, but not limited to, the following examples.

Example 1

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 75 g of acetaldehyde. The acetalization reaction was carried out to precipitate a reaction product by maintaining the solution temperature at 40° C.

The polyvinyl alcohol used had a degree of polymerization of 400, a degree of saponification of 97.7 mol %, and contained 0.4 mol % of a constitutional unit with a carboxyl group represented by the above formula (1-4) (in the formula (1-4), $R^6$ represents a single bond, $X^6$ represents a hydrogen atom, $R^7$ represents a methylene group, and $X^7$ represents a hydrogen atom).

Then, the reaction solution was held to maintain the temperature at 40° C. for three hours, thereby completing the reaction. A modified polyvinyl acetal resin powder was obtained through neutralization, washing with water, and drying by normal methods.

The obtained modified polyvinyl acetal resin was dissolved in DMSO-$d_6$ (dimethylsulfoxide), and analyzed by $^{13}$C-NMR (nuclear magnetic resonance spectrum) to confirm the presence of the constitutional unit with a carboxyl group represented by the formula (1-4) (amount: 0.4 mol %). Table 1 shows the acetal group content, the acetyl group content, and the hydroxyl group content measured by $^{13}$C-NMR.

An amount of 10 g of the obtained modified polyvinyl acetal resin, 85 g of an epoxy resin, 3 g of dicyandiamide (DICY available from Mitsubishi Chemical Corporation) as a curing agent, and 2 g of an imidazole compound (jER-CURE EMI24 available from Mitsubishi Chemical Corporation) as a curing accelerator were blended to prepare an adhesive composition in which the polyvinyl acetal resin and the epoxy resin were mixed at a weight ratio of 10:85.

The epoxy resin used was a bisphenol A-type epoxy resin (jER 828 available from Mitsubishi Chemical Corporation, epoxy equivalent: 190, molecular weight: 370). The obtained adhesive composition was applied to a release-treated polyethylene terephthalate (PET) film to a dry thickness of 20 μm, and dried at 125° C. to prepare a resin sheet.

Examples 2 to 8

Using the modified polyvinyl acetal resin obtained in Example 1, an adhesive composition and a resin sheet were produced as in Example 1, except that the epoxy resin, the curing agent, and the curing accelerator were added as shown in Table 1.

The epoxy resins used are listed below.
(Epoxy Resin)

Bisphenol F-type epoxy resin (jER 807 available from Mitsubishi Chemical Corporation, epoxy equivalent: 170) Neopentyl glycol diglycidyl ether (epoxy equivalent: 138, molecular weight: 216) Polypropylene glycol diglycidyl ether (EX-920 available from Nagase ChemteX Corporation, epoxy equivalent: 176)

Example 9

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 75 g of acetaldehyde. The acetalization reaction was carried out to precipitate a reaction product by maintaining the solution temperature at 40° C.

The polyvinyl alcohol used had a degree of polymerization of 400, a degree of saponification of 97.7 mol %, and contained 2.0 mol % of a constitutional unit with a carboxyl group represented by the above formula (1-4) (in the formula (1-4), $R^6$ represents a single bond, $X^6$ represents a hydrogen atom, $R^7$ represents a methylene group, and $X^7$ represents a hydrogen atom).

Then, the reaction solution was held to maintain the temperature at 40° C. for three hours, thereby completing the reaction. A modified polyvinyl acetal resin powder was obtained through neutralization, washing with water, and drying by normal methods.

The obtained modified polyvinyl acetal resin was dissolved in DMSO-$d_6$ (dimethylsuofoxide), and analyzed by $^{13}$C-NMR (nuclear magnetic resonance spectrum) to confirm the presence of the constitutional unit with a carboxyl group represented by the formula (1-4) (amount: 2.0 mol %).

An adhesive composition and a resin sheet were produced as in Example 1, except that the obtained modified polyvinyl acetal resin was used, and that the epoxy resin, the curing agent, and the curing accelerator were added as shown in Table 1.

Example 10

An adhesive composition and a resin sheet were produced as in Example 1, except that the modified polyvinyl acetal resin obtained in Example 9 was used, and that the epoxy resin, the curing agent, and the curing accelerator were added as shown in Table 1.

Example 11

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 75 g of acetaldehyde. The acetalization reaction was carried out to precipitate a reaction product by maintaining the solution temperature at 40° C.

The polyvinyl alcohol used had a degree of polymerization of 1,000, a degree of saponification of 97.6 mol %, and contained 0.4 mol % of a constitutional unit with a carboxyl group represented by the above formula (1-4) (in the formula (1-4), $R^6$ represents a single bond, $X^6$ represents a hydrogen atom, $R^7$ represents a methylene group, and $X^7$ represents a hydrogen atom).

Then, the reaction solution was held to maintain the temperature at 40° C. for three hours, thereby completing the reaction. A modified polyvinyl acetal resin powder was obtained through neutralization, washing with water, and drying by normal methods.

The obtained modified polyvinyl acetal resin was dissolved in DMSO-$d_6$ (dimethylsulfoxide), and analyzed by $^{13}$C-NMR (nuclear magnetic resonance spectrum) to confirm the presence of the constitutional unit with a carboxyl group represented by the above formula (1-4) (amount: 0.4 mol %).

An adhesive composition and a resin sheet were produced as in Example 1, except that the obtained modified polyvinyl acetal resin was used, and that the epoxy resin, the curing agent, and the curing accelerator were added as shown in Table 1.

Example 12

An adhesive composition and a resin sheet were produced as in Example 1, except that the modified polyvinyl acetal resin obtained in Example 11 was used, and that the epoxy resin, the curing agent, and the curing accelerator were added as shown in Table 1.

Example 13

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 75 g of acetaldehyde. The acetalization reaction was carried out to precipitate a reaction product by maintaining the solution temperature at 40° C.

The polyvinyl alcohol used had a degree of polymerization of 1,700, a degree of saponification of 97.7 mol %, and contained 0.4 mol % of a constitutional unit with a carboxyl group represented by the above formula (1-4) (in the formula (1-4), $R^6$ represents a single bond, $X^6$ represents a hydrogen atom, $R^7$ represents a methylene group, and $X^7$ represents a hydrogen atom).

Then, the reaction solution was held to maintain the temperature at 40° C. for three hours, thereby completing the reaction. A modified polyvinyl acetal resin powder was obtained through neutralization, washing with water, and drying by normal methods.

The obtained modified polyvinyl acetal resin was dissolved in DMSO-$d_6$ (dimethylsulfoxide), and analyzed by $^{13}$C-NMR (nuclear magnetic resonance spectrum) to confirm the presence of a constitutional unit with a carboxyl group represented by the formula (1-4) (amount: 0.4 mol %).

An adhesive composition and a resin sheet were produced as in Example 1, except that the obtained modified polyvinyl acetal resin was used, and that the epoxy resin, the curing agent, and the curing accelerator were added as shown in Table 1.

Example 14

An adhesive composition and a resin sheet were produced as in Example 1, except that the modified polyvinyl acetal resin obtained in Example 13 was used, and that the epoxy resin, the curing agent, and the curing accelerator were added as shown in Table 1.

Examples 15 to 17

Using the modified polyvinyl acetal resin obtained in Example 1, an adhesive composition and a resin sheet were produced as in Example 1, except that the epoxy resin, the curing agent, and the curing accelerator were added as shown in Table 1.

Example 18

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 75 g of formaldehyde. The acetalization reaction was carried out to precipitate a reaction product by maintaining the solution temperature at 40° C.

The polyvinyl alcohol used was the same as that used in Example 1.

Then, the reaction solution was held to maintain the temperature at 40° C. for three hours, thereby completing the reaction. A modified polyvinyl acetal resin powder was obtained through neutralization, washing with water, and drying by normal methods.

The obtained modified polyvinyl acetal resin was dissolved in DMSO-$d_6$ (dimethylsulfoxide), and analyzed by $^{13}$C-NMR (nuclear magnetic resonance spectrum) to confirm the presence of the constitutional unit with a carboxyl group represented by the above formula (1-4) (amount: 0.4 mol %).

An adhesive composition and a resin sheet were produced as in Example 1, except that the obtained modified polyvinyl acetal resin was used, and that the epoxy resin, the curing agent, and the curing accelerator were added as shown in Table 1.

Example 19

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 150 g of n-butyraldehyde. The acetalization reaction was carried out to precipitate a reaction product by maintaining the solution temperature at 40° C.

The polyvinyl alcohol used had a degree of polymerization of 400 and a degree of saponification of 97.7 mol %, and contained 0.4 mol % of a constitutional unit with a carboxyl group represented by the above formula (1-4) (in the formula (1-4), $R^6$ represents a single bond, $X^6$ represents a hydrogen atom, $R^7$ represents a vinylene group, and $X^7$ represents a hydrogen atom).

Then, the reaction solution was held to maintain the temperature at 40° C. for three hours, thereby completing the reaction. A modified polyvinyl acetal resin powder was obtained through neutralization, washing with water, and drying by normal methods.

The obtained modified polyvinyl acetal resin was dissolved in DMSO-$d_6$ (dimethylsulfoxide), and analyzed by $^{13}$C-NMR (nuclear magnetic resonance spectrum) to confirm the presence of a constitutional unit with a carboxyl group represented by the above formula (1-4) (amount: 0.4 mol %).

An adhesive composition and a resin sheet were produced as in Example 1, except that the obtained modified polyvinyl acetal resin was used, and that the epoxy resin, the curing agent, and the curing accelerator were added as shown in Table 1.

Example 20

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 150 g of n-butyraldehyde. The acetalization reaction was carried out to precipitate a reaction product by maintaining the solution temperature at 40° C.

The polyvinyl alcohol used had a degree of polymerization of 400 and a degree of saponification of 97.7 mol %, and contained 2.0 mol % of a constitutional unit with a carboxyl group represented by the above formula (1-4) (in the formula (1-4), $R^6$ represents a single bond, $X^6$ represents a hydrogen atom, $R^7$ represents a vinylene group, and $X^7$ represents a hydrogen atom).

Then the reaction solution was held to maintain the temperature at 40° C. for three hours, thereby completing the reaction. A modified polyvinyl acetal resin powder was obtained through neutralization, washing with water, and drying by normal methods.

The obtained modified polyvinyl acetal resin was dissolved in DMSO-$d_6$ (dimethylsulfoxide), and analyzed by $^{13}$C-NMR (nuclear magnetic resonance spectrum) to confirm the presence of the constitutional unit with a carboxyl group represented by the above formula (1-4) (amount: 2.0 mol %).

An adhesive composition and a resin sheet were produced as in Example 1, except that the obtained modified polyvinyl acetal resin was used, and that the epoxy resin, the curing agent, and the curing accelerator were added as shown in Table 1.

Example 21

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 150 g of n-butyraldehyde. The acetalization reaction was carried out to precipitate a reaction product by maintaining the solution temperature at 40° C.

The polyvinyl alcohol used had a degree of polymerization of 400 and a degree of saponification of 97.7 mol %, and contained 5.0 mol % of a constitutional unit with a carboxyl group represented by the above formula (1-4) (in the formula (1-4), $R^6$ represents a single bond, $X^6$ represents a hydrogen atom, $R^7$ represents a vinylene group, and $X^7$ represents a hydrogen atom).

Then, the reaction solution was held to maintain the temperature at 40° C. for three hours, thereby completing the reaction. A modified polyvinyl acetal resin powder was obtained through neutralization, washing with water, and drying by normal methods.

The obtained modified polyvinyl acetal resin was dissolved in DMSO-$d_6$ (dimethylsulfoxide), and analyzed by $^{13}$C-NMR (nuclear magnetic resonance spectrum) to confirm the presence of a constitutional unit with a carboxyl group represented by the formula (1-4) (amount: 5.0 mol %).

An adhesive composition and a resin sheet were produced as in Example 1, except that the obtained modified polyvinyl acetal resin was used, and that the epoxy resin, the curing agent, and the curing accelerator were added as shown in Table 1.

Examples 22 and 23

An adhesive composition and a resin sheet were produced as in Example 1, except that the modified polyvinyl acetal resin obtained in Example 19 was used, and that the epoxy resin, the curing agent, and the curing accelerator were added as shown in Table 1.

Example 24

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 145 g of n-butyraldehyde. The acetalization reaction was carried out to precipitate a reaction product by maintaining the solution temperature at 40° C.

The polyvinyl alcohol used had a degree of polymerization of 1,700 and a degree of saponification of 97.7 mol %, and contained 0.4 mol % of a constitutional unit with a carboxyl group represented by the above formula (1-4) (in the formula (1-4), $R^6$ represents a single bond, $X^6$ represents a hydrogen atom, $R^7$ represents a vinylene group, and $X^7$ represents a hydrogen atom).

Then, the reaction solution was held to maintain the temperature at 40° C. for three hours, thereby completing the reaction. A modified polyvinyl acetal resin powder was obtained through neutralization, washing with water, and drying by normal methods.

The obtained modified polyvinyl acetal resin was dissolved in DMSO-$d_6$ (dimethylsulfoxide), and analyzed by $^{13}$C-NMR (nuclear magnetic resonance spectrum) to confirm the presence of a constitutional unit with a carboxyl group represented by the above formula (1-4) (amount: 0.4 mol %).

An adhesive composition and a resin sheet were produced as in Example 1, except that the obtained modified polyvinyl acetal resin was used, and that the epoxy resin, the curing agent, and the curing accelerator were added as shown in Table 1.

Example 25

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 140 g of n-butyraldehyde. The acetalization reaction was carried out to precipitate a reaction product by maintaining the solution temperature at 40° C.

The polyvinyl alcohol used was the same as that used in Example 24.

Then, the reaction solution was held to maintain the temperature at 40° C. for three hours, thereby completing the reaction. A modified polyvinyl acetal resin powder was obtained through neutralization, washing with water, and drying by normal methods.

The obtained modified polyvinyl acetal resin was dissolved in DMSO-$d_6$ (dimethylsulfoxide), and analyzed by $^{13}$C-NMR (nuclear magnetic resonance spectrum) to confirm the presence of a constitutional unit with a carboxyl group represented by the above formula (1-4) (amount: 0.4 mol %).

An adhesive composition and a resin sheet were produced as in Example 1, except that the obtained modified polyvinyl acetal resin was used, and that the epoxy resin, the curing agent, and the curing accelerator were added as shown in Table 1.

Example 26

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 155 g of n-butyraldehyde. The acetalization reaction was carried out to precipitate a reaction product by maintaining the solution temperature at 40° C.

The polyvinyl alcohol used was the same as that used in Example 1.

Then, the reaction solution was held to maintain the temperature at 40° C. for three hours, thereby completing the reaction. A modified polyvinyl acetal resin powder was obtained through neutralization, washing with water, and drying by normal methods.

The obtained modified polyvinyl acetal resin was dissolved in DMSO-$d_6$ (dimethylsulfoxide), and analyzed by $^{13}$C-NMR (nuclear magnetic resonance spectrum) to confirm the presence of a constitutional unit with a carboxyl group represented by the above formula (1-4) (amount: 0.4 mol %).

An adhesive composition and a resin sheet were produced as in Example 1, except that the obtained modified polyvinyl acetal resin was used, and that the epoxy resin, the curing agent, and the curing accelerator were added as shown in Table 1.

Example 27

An adhesive composition and a resin sheet were produced as in Example 1, except that the modified polyvinyl acetal resin obtained in Example 21 was used, and that the epoxy resin, the curing agent, and the curing accelerator were added as shown in Table 1.

Example 28

Using the polyvinyl acetal resin obtained in Example 1, an adhesive composition and a resin sheet were produced as in Example 1, except that the epoxy resin, the curing agent, and the curing accelerator were added as shown in Table 1.

Example 29

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight, 50 g of acetaldehyde, and 50 g of butyraldehyde. The acetalization reaction was carried out to precipitate a reaction product by maintaining the solution temperature at 40° C.

The polyvinyl alcohol used had a degree of polymerization of 800 and a degree of saponification of 97.7 mol %, and contained 2.0 mol % of a constitutional unit with a carboxyl group represented by the above formula (1-4) (in the formula (1-4), $R^6$ represents a single bond, $X^6$ represents a hydrogen atom, $R^7$ represents a methylene group, and $X^7$ represents a hydrogen atom).

Then, the reaction solution was held to maintain the temperature at 40° C. for three hours, thereby completing the reaction. A modified polyvinyl acetal resin powder was obtained through neutralization, washing with water, and drying by normal methods.

The obtained modified polyvinyl acetal resin was dissolved in DMSO-$d_6$ (dimethylsulfoxide), and analyzed by $^{13}$C-NMR (nuclear magnetic resonance spectrum) to confirm the presence of the constitutional unit with a carboxyl group represented by the formula (1-4) (amount: 2.0 mol %).

An adhesive composition and a resin sheet were produced as in Example 1, except that the obtained modified polyvinyl acetal resin was used, and that the epoxy resin, the curing agent, and the curing accelerator were added as shown in Table 1.

Example 30

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 75 g of acetaldehyde.

The acetalization reaction was carried out to precipitate a reaction product by maintaining the solution temperature at 40° C.

The polyvinyl alcohol used was the same as that used in Example 29.

Then, the reaction solution was held to maintain the temperature at 40° C. for three hours, thereby completing the reaction. A modified polyvinyl acetal resin powder was obtained through neutralization, washing with water, and drying by normal methods.

The obtained modified polyvinyl acetal resin was dissolved in DMSO-$d_6$ (dimethylsulfoxide), and analyzed by $^{13}$C-NMR (nuclear magnetic resonance spectrum) to confirm the presence of the constitutional unit with a carboxyl group represented by the above formula (1-4) (amount: 2.0 mol %).

An adhesive composition and a resin sheet were produced as in Example 1, except that the obtained modified polyvinyl acetal resin was used, and that the epoxy resin, the curing agent, and the curing accelerator were added as shown in Table 1.

Example 31

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 75 g of acetaldehyde. The acetalization reaction was carried out to precipitate a reaction product by maintaining the solution temperature at 40° C.

The polyvinyl alcohol used had a degree of polymerization of 800 and a degree of saponification of 97.7 mol %, and contained 2.0 mol % of a constitutional unit with a carboxyl group represented by the above formula (1-2) (in the formula (1-2), $R^2$ represents a single bond, $X^2$ represents a hydrogen atom, $R^3$ represents a single bond, and $X^3$ represents a hydrogen atom).

Then, the reaction solution was held to maintain the temperature at 40° C. for three hours, thereby completing the reaction. A modified polyvinyl acetal resin powder was obtained through neutralization, washing with water, and drying by normal methods.

The obtained modified polyvinyl acetal resin was dissolved in DMSO-$d_6$ (dimethylsulfoxide), and analyzed by $^{13}$C-NMR (nuclear magnetic resonance spectrum) to confirm the presence of a constitutional unit with a carboxyl group represented by the formula (1-2) (amount: 2.0 mol %).

An adhesive composition and a resin sheet were produced as in Example 1, except that the obtained modified polyvinyl acetal resin was used, and that the epoxy resin, the curing agent, and the curing accelerator were added as shown in Table 1.

Example 32

An amount of 200 g of polyvinyl alcohol was dissolved in 1,800 g of pure water, and stirred at 90° C. for about two hours to be dissolved. The solution was cooled to 40° C., and to the solution were added 150 g of hydrochloric acid having a concentration of 35% by weight and 75 g of acetaldehyde. The acetalization reaction was carried out to precipitate a reaction product by maintaining the solution temperature at 40° C.

The polyvinyl alcohol used had a degree of polymerization of 800 and a degree of saponification of 97.7 mol %, and contained 2.0 mol % of a constitutional unit with a carboxyl group represented by the above formula (1-3) (in the formula (1-3), $R^4$ represents a single bond, $X^4$ represents a hydrogen atom, $R^5$ represents a single bond, and $X^5$ represents a hydrogen atom).

Then, the reaction solution was held to maintain the temperature at 40° C. for three hours, thereby completing the reaction. A modified polyvinyl acetal resin powder was obtained through neutralization, washing with water, and drying by normal methods.

The obtained modified polyvinyl acetal resin was dissolved in DMSO-$d_6$ (dimethylsulfoxide), and analyzed by $^{13}$C-NMR (nuclear magnetic resonance spectrum) to confirm the presence of a constitutional unit with a carboxyl group represented by the formula (1-3) (amount: 2.0 mol %).

An adhesive composition and a resin sheet were produced as in Example 1, except that the obtained modified polyvinyl acetal resin was used, and that the epoxy resin, the curing agent, and the curing accelerator were added as shown in Table 1.

Example 33

An amount of 200 g of polyvinyl alcohol was added to 1,800 g of pure water, and stirred at 90° C. for about two hours. The solution was cooled to 40° C., and to the solution were added 150 g of hydrochloric acid having a concentration of 35% by weight and 75 g of acetaldehyde. The acetalization reaction was carried out to precipitate a reaction product by maintaining the solution temperature at 40° C.

The polyvinyl alcohol used had a degree of polymerization of 800 and a degree of saponification of 97.7 mol %, and contained 2.0 mol % of a constitutional unit with a carboxyl group represented by the above formula (1-1) (in the formula (1-1), $R^1$ represents a methylene group, $X^1$ represents a hydrogen atom).

Then, the reaction solution was held to maintain the temperature at 40° C. for three hours, thereby completing the reaction. A modified polyvinyl acetal resin powder was obtained through neutralization, washing with water, and drying by normal methods.

The obtained modified polyvinyl acetal resin was dissolved in DMSO-$d_6$ (dimethylsulfoxide), and analyzed by $^{13}$C-NMR (nuclear magnetic resonance spectrum) to confirm the presence of a constitutional unit with a carboxyl group represented by the formula (1-1) (amount: 2.0 mol %).

An adhesive composition and a resin sheet were produced as in Example 1, except that the obtained modified polyvinyl acetal resin was used, and that the epoxy resin, the curing agent, and the curing accelerator were added as shown in Table 1.

Comparative Example 1

A polyvinyl acetal resin was obtained as in Example 1, except that the polyvinyl alcohol used had a degree of polymerization of 600 and a degree of saponification of 99.5 mol %.

The obtained polyvinyl acetal resin was dissolved in DMSO-$d_6$ (dimethylsulfoxide), and analyzed by $^{13}$C-NMR (nuclear magnetic resonance spectrum). The presence of a constitutional unit with an acid-modified group was not confirmed.

Table 1 shows the acetal group content, the acetyl group content, and the hydroxyl group content measured by $^{13}$C-NMR.

An adhesive composition and a resin sheet were produced as in Example 1, except that 30 g of the obtained polyvinyl acetal resin and 70 g of neopentyl glycol diglycidyl ether were blended to prepare an adhesive composition in which the polyvinyl acetal resin and the epoxy resin are mixed at a weight ratio of 30:70.

Comparative Examples 2 to 3

An adhesive composition and a resin sheet were produced as in Example 1, except that the modified polyvinyl acetal resin obtained in Comparative Example 1 was used, and that the epoxy resin, the curing agent, and the curing accelerator were added as shown in Table 1.

Comparative Example 4

A polyvinyl acetal resin was obtained as in Example 1, except that the polyvinyl alcohol used had a degree of polymerization of 400 and a degree of saponification of 97.7 mol %.

The obtained polyvinyl acetal resin was dissolved in DMSO-$d_6$ (dimethylsulfoxide), and analyzed by $^{13}$C-NMR (nuclear magnetic resonance spectrum). The presence of a constitutional unit with an acid-modified group was not confirmed.

Table 1 shows the acetal group content, the acetyl group content, and the hydroxyl group content measured by $^{13}$C-NMR.

An adhesive composition and a resin sheet were produced as in Example 1, except that the obtained modified polyvinyl acetal resin was used, and that the epoxy resin, the curing agent, and the curing accelerator were added as shown in Table 1.

<Evaluation>

The adhesive compositions and resin sheets obtained in the examples and comparative examples were evaluated for the followings. Table 2 shows the results.

(1) Gel Fraction

To about 0.1 g (w1) of a sample of the resin sheet was added 40 g of a solvent mixture prepared by mixing toluene and ethanol at a weight ratio of 1:1, and the mixture was stirred for 24 hours so that the sample was dissolved again. Then, solid-liquid separation was performed using a 200-mesh stainless-steel sieve whose mass (w2) was measured in advance. The stainless-steel sieve was taken out and vacuum-dried at 100° C. for one hour, followed by measurement of the mass (w3) thereof. The gel fraction was calculated using the following equation.

Gel fraction (%)={(w3−w2)/w1}×100

The obtained gel fraction was evaluated based on the following criteria.

A higher gel fraction indicates higher curability.
∘∘ (Excellent): 80% or higher
∘ (Good): 40% or higher and lower than 80%
Δ (Average): 10% or higher and lower than 40%
x (Poor): Lower than 10%

(2) Storage Stability

An amount of 10 g of the adhesive composition was dissolved in 90 g of a solvent mixture prepared by mixing toluene and ethanol at a weight ratio of 1:1, thereby preparing a sample solution. The viscosity of the obtained sample solution was measured immediately after the preparation of the sample solution and a month later using a B-type viscometer to obtain the change rate of the solution viscosity. The obtained change rate was evaluated based on the following criteria.

∘∘ (Excellent): Lower than 10%
∘ (Good): 10% or higher and lower than 20%
Δ (Average): 20% or higher and lower than 30%
x (Poor): 30% or higher (3) Tensile Modulus of Elasticity, Degree of Elongation, Yield Point Stress The obtained resin sheet was peeled from the PET film, and the tensile modulus of elasticity (MPa), degree of elongation (%), and yield point stress (MPa) of the peeled sheet were measured at a tensile speed of 20 ram/min by a method in conformity with JIS K 7113 using an autograph (AGS-J available from Shimadzu Corporation).

(4) Shear Adhesive Force

The obtained adhesive composition was applied to various metal bases, and heated at 170° C. for 30 minutes to be cured. The shear adhesive force thereof was measured under the conditions of a temperature of 20° C. and a tensile speed of 5 ram/min by a method in conformity with JIS K 6850.

The metal bases used were an aluminum base, a stainless steel (SUS304) base, and a SPCC steel plate. With a higher shear adhesive force, peeling is less likely to occur even under application of an external force, which indicates that the excellent adhesive force is achieved.

(5) Peel Adhesive Force

The obtained adhesive composition was applied to a SPCC steel plate to bond two SPCC steel plates to each other, and heated at 170° C. for 30 minutes to be cured. The peel adhesive force thereof was measured under the conditions of a peel angle of 180° and a peel rate of 200 mm/min by a method in conformity with JIS K 6854-3.

(6) Impact Resistance

The obtained adhesive composition was poured into a mold and heated at 170° C. for 30 minutes to provide a cured resin article. A Charpy impact test was performed on the obtained cured resin article by a method in conformity with JIS K 7111 using a digital impact tester DG-UB type (available from Toyo Seiki Seisakusho, Ltd.) to measure the Charpy impact value when the cured resin article is broken, thereby evaluating the impact resistance.

(7) Compatibility

In each of the examples and comparative examples, a mixture of a polyvinyl acetal resin and an epoxy resin was prepared without adding a curing agent and a curing accelerator. The haze value of the obtained mixture was measured using a spectrophotometer (U4000 available from Hitachi, Ltd.).

TABLE 1

| | Polyvinyl acetal resin | | | | | | | Adhesive composition |
|---|---|---|---|---|---|---|---|---|
| | Degree of polymerization | Acetoacetal group content (mol %) | Butyral group content (mol %) | Formal group content (mol %) | Ratio between acetoacetal group content and butyral group content | Acetyl group content (mol %) | Hydroxyl group content (mol %) | Amount of constitutional unit with acid-modified group (mol %) | Amount of added polyvinyl acetal resin (g) |
| Example 1 | 400 | 71.6 | — | — | 10:0 | 2.3 | 25.7 | 0.4 | 10 |
| Example 2 | 400 | 71.6 | — | — | 10:0 | 2.3 | 25.7 | 0.4 | 10 |
| Example 3 | 400 | 71.6 | — | — | 10:0 | 2.3 | 25.7 | 0.4 | 10 |
| Example 4 | 400 | 71.6 | — | — | 10:0 | 2.3 | 25.7 | 0.4 | 10 |
| Example 5 | 400 | 71.6 | — | — | 10:0 | 2.3 | 25.7 | 0.4 | 10 |
| Example 6 | 400 | 71.6 | — | — | 10:0 | 2.3 | 25.7 | 0.4 | 10 |
| Example 7 | 400 | 71.6 | — | — | 10:0 | 2.3 | 25.7 | 0.4 | 10 |
| Example 8 | 400 | 71.6 | — | — | 10:0 | 2.3 | 25.7 | 0.4 | 10 |
| Example 9 | 400 | 70.0 | — | — | 10:0 | 2.3 | 25.7 | 2.0 | 10 |
| Example 10 | 400 | 70.0 | — | — | 10:0 | 2.3 | 25.7 | 2.0 | 10 |
| Example 11 | 1000 | 71.6 | — | — | 10:0 | 2.3 | 25.7 | 0.4 | 10 |
| Example 12 | 1000 | 71.6 | — | — | 10:0 | 2.3 | 25.7 | 0.4 | 10 |
| Example 13 | 1700 | 71.6 | — | — | 10:0 | 2.3 | 25.7 | 0.4 | 10 |
| Example 14 | 1700 | 71.6 | — | — | 10:0 | 2.3 | 25.7 | 0.4 | 10 |
| Example 15 | 400 | 71.6 | — | — | 10:0 | 2.3 | 25.7 | 0.4 | 20 |
| Example 16 | 400 | 71.6 | — | — | 10:0 | 2.3 | 25.7 | 0.4 | 20 |
| Example 17 | 400 | 71.6 | — | — | 10:0 | 2.3 | 25.7 | 0.4 | 50 |
| Example 18 | 400 | — | — | 71.6 | — | 2.3 | 25.7 | 0.4 | 50 |
| Example 19 | 400 | — | 71.6 | — | 0:10 | 2.3 | 25.7 | 0.4 | 10 |
| Example 20 | 400 | — | 70.0 | — | 0:10 | 2.3 | 25.7 | 2.0 | 10 |
| Example 21 | 400 | — | 67.0 | — | 0:10 | 2.3 | 25.7 | 5.0 | 10 |
| Example 22 | 400 | — | 71.6 | — | 0:10 | 2.3 | 25.7 | 0.4 | 20 |
| Example 23 | 400 | — | 71.6 | — | 0:10 | 2.3 | 25.7 | 0.4 | 30 |
| Example 24 | 1700 | — | 67.5 | — | 0:10 | 2.3 | 29.8 | 0.4 | 10 |
| Example 25 | 1700 | — | 62.3 | — | 0:10 | 2.3 | 35.0 | 0.4 | 10 |
| Example 26 | 400 | — | 76.0 | — | 0:10 | 2.3 | 21.3 | 0.4 | 10 |
| Example 27 | 400 | — | 67.0 | — | 0:10 | 2.3 | 25.7 | 5.0 | 50 |
| Example 28 | 400 | 71.6 | — | — | 10:0 | 2.3 | 25.7 | 0.4 | 50 |
| Example 29 | 800 | 42.0 | 28.0 | — | 6:4 | 2.3 | 25.7 | 2.0 | 10 |
| Example 30 | 800 | 70.0 | — | — | 10:0 | 2.3 | 25.7 | 2.0 | 10 |
| Example 31 | 800 | 70.0 | — | — | 10:0 | 2.3 | 25.7 | 2.0 | 10 |
| Example 32 | 800 | 70.0 | — | — | 10:0 | 2.3 | 25.7 | 2.0 | 10 |
| Example 33 | 800 | 70.0 | — | — | 10:0 | 2.3 | 25.7 | 2.0 | 10 |
| Comparative Example 1 | 600 | 79.0 | — | — | 10:0 | 0.5 | 20.5 | 0.0 | 30 |
| Comparative Example 2 | 600 | 79.0 | — | — | 10:0 | 0.5 | 20.5 | 0.0 | 10 |
| Comparative Example 3 | 600 | 79.0 | — | — | 10:0 | 0.5 | 20.5 | 0.0 | 10 |
| Comparative Example 4 | 400 | 58.0 | — | — | 10:0 | 2.3 | 39.7 | 0.0 | 10 |

| | Adhesive composition | | | | | | |
|---|---|---|---|---|---|---|---|
| | Epoxy resin (g) | | | | Curing agent (g) Dicyandiamide | Curing accelerator (g) Imidazole compound | Number of acid-modified groups/number of epoxy groups |
| | Bisphenol A-type epoxy resin | Bisphenol F-type epoxy resin | Neopentyl glycol diglycidyl ether | Polypropylene glycol diglycidyl ether | | | |
| Example 1 | 85 | — | — | — | 3 | 2 | 0.00154 |
| Example 2 | — | 85 | — | — | 3 | 2 | 0.00138 |
| Example 3 | — | — | 85 | — | 3 | 2 | 0.00112 |
| Example 4 | — | — | — | 85 | 3 | 2 | 0.00143 |
| Example 5 | 75 | — | — | 10 | 3 | 2 | 0.00153 |
| Example 6 | — | 75 | — | 10 | 3 | 2 | 0.00138 |
| Example 7 | 75 | — | 10 | — | 3 | 2 | 0.00148 |
| Example 8 | — | 75 | 10 | — | 3 | 2 | 0.00134 |
| Example 9 | 75 | — | — | 10 | 3 | 2 | 0.00764 |
| Example 10 | — | 75 | — | 10 | 3 | 2 | 0.00692 |
| Example 11 | 75 | — | — | 10 | 3 | 2 | 0.00153 |
| Example 12 | — | 75 | — | 10 | 3 | 2 | 0.00138 |
| Example 13 | 75 | — | — | 10 | 3 | 2 | 0.00153 |
| Example 14 | — | 75 | — | 10 | 3 | 2 | 0.00138 |
| Example 15 | — | 55 | — | 20 | 3 | 2 | 0.00315 |
| Example 16 | 55 | — | — | 20 | 3 | 2 | 0.00342 |
| Example 17 | 25 | — | — | 20 | 3 | 2 | 0.01410 |
| Example 18 | 45 | — | — | — | 3 | 2 | 0.01460 |
| Example 19 | 75 | — | — | 10 | 3 | 2 | 0.00153 |
| Example 20 | 75 | — | — | 10 | 3 | 2 | 0.00764 |
| Example 21 | 75 | — | — | 10 | 3 | 2 | 0.01910 |

TABLE 1-continued

| | | | | | | | |
|---|---|---|---|---|---|---|---|
| Example 22 | 75 | — | — | 10 | 3 | 2 | 0.00305 |
| Example 23 | 75 | — | — | 10 | 3 | 2 | 0.00458 |
| Example 24 | 75 | — | — | 10 | 3 | 2 | 0.00153 |
| Example 25 | 75 | — | — | 10 | 3 | 2 | 0.00153 |
| Example 26 | 75 | — | — | 10 | 3 | 2 | 0.00153 |
| Example 27 | 55 | — | — | — | 3 | 2 | 0.14890 |
| Example 28 | 75 | — | — | 10 | 3 | 2 | 0.00764 |
| Example 29 | 75 | — | — | 10 | 3 | 2 | 0.00764 |
| Example 30 | 75 | — | — | 10 | 3 | 2 | 0.00764 |
| Example 31 | 75 | — | — | 10 | 3 | 2 | 0.00764 |
| Example 32 | 75 | — | — | 10 | 3 | 2 | 0.00764 |
| Example 33 | 75 | — | — | 10 | 3 | 2 | 0.00764 |
| Comparative Example 1 | — | — | 70 | — | — | — | — |
| Comparative Example 2 | 75 | — | — | 10 | 3 | 2 | — |
| Comparative Example 3 | — | — | 75 | 10 | 3 | 2 | — |
| Comparative Example 4 | 75 | — | — | 10 | 3 | 2 | — |

TABLE 2

| | Evaluation | | | | | | | | |
|---|---|---|---|---|---|---|---|---|---|
| | | | Composition strength | | | Shear adhesive force (Mpa) | | | Impact resistance | |
| | Gel fraction Evaluation | Storage stability Evaluation | Tensile modulus of elasticity (Mpa) | Degree of elongation (%) | Yield point stress (Mpa) | Aluminum | SUS 304 | SPCC steel plate | Peel adhesive force (N/25 mm) | Charpy impact value (J/m$^2$) | Compatibility Haze (%) |
| Example 1 | ○ | ○ | 900 | 45 | 65 | 20 | 24.2 | 31.4 | 145 | 1.7 | 7.5 |
| Example 2 | ○ | ○ | 920 | 50 | 60 | 19.6 | 21.5 | 27.9 | 130 | 1.5 | 5.0 |
| Example 3 | ○ | ○○ | 700 | 60 | 60 | 2.8 | 3.4 | 3.9 | 80 | 2.2 | 0.8 |
| Example 4 | ○ | ○ | 720 | 60 | 60 | 2.1 | 3.2 | 3.8 | 75 | 1.9 | 2.0 |
| Example 5 | ○○ | ○ | 1200 | 40 | 90 | 18.4 | 21.6 | 28.7 | 230 | 3.9 | 0.9 |
| Example 6 | ○○ | ○ | 1350 | 30 | 75 | 16.5 | 19.6 | 25.2 | 210 | 3.6 | 1.5 |
| Example 7 | ○○ | ○ | 1300 | 30 | 50 | 17.7 | 20.2 | 26.1 | 225 | 3.5 | 1.0 |
| Example 8 | ○○ | ○ | 1450 | 25 | 45 | 15.1 | 17.7 | 239 | 200 | 3.2 | 1.5 |
| Example 9 | ○○ | ○ | 950 | 45 | 90 | 23.4 | 29.2 | 37.8 | 245 | 4.2 | 0.9 |
| Example 10 | ○○ | ○ | 1000 | 45 | 90 | 22.5 | 28.1 | 35.6 | 225 | 4 | 2.7 |
| Example 11 | ○○ | ○ | 850 | 50 | 75 | 23.8 | 32.4 | 39.1 | 240 | 4.1 | 1.5 |
| Example 12 | ○○ | ○ | 900 | 45 | 75 | 22.9 | 30.5 | 38.2 | 215 | 4 | 4.0 |
| Example 13 | ○ | ○ | 750 | 65 | 90 | 26.2 | 35 | 42.2 | 245 | 4.4 | 3.5 |
| Example 14 | ○○ | ○ | 1300 | 30 | 75 | 25.6 | 33.3 | 41 | 220 | 4.2 | 3.2 |
| Example 15 | ○ | ○○ | 800 | 75 | 60 | 29.8 | 36.5 | 47.2 | 175 | 4.7 | 1.5 |
| Example 16 | ○○ | ○○ | 900 | 70 | 62 | 31.5 | 37.1 | 48.8 | 185 | 5 | 3.2 |
| Example 17 | ○ | ○○ | 950 | 60 | 60 | 42.6 | 48.9 | 57.2 | 120 | 1.2 | 5.5 |
| Example 18 | ○ | ○○ | 900 | 55 | 58 | 42.6 | 48.9 | 57.2 | 105 | 1.5 | 6.2 |
| Example 19 | ○ | ○ | 900 | 48 | 65 | 11.5 | 14.3 | 20 | 245 | 4.2 | 2.1 |
| Example 20 | ○ | ○ | 980 | 44 | 68 | 12.2 | 15.6 | 21.5 | 260 | 4.7 | 1.6 |
| Example 21 | ○○ | ○ | 1020 | 41 | 70 | 15.8 | 19.5 | 25.7 | 270 | 5.4 | 1.4 |
| Example 22 | ○○ | ○ | 830 | 52 | 61 | 13 | 16.2 | 22.2 | 265 | 5.1 | 2.8 |
| Example 23 | ○○ | Δ | 750 | 56 | 58 | 14.5 | 18.1 | 23.7 | 260 | 5.2 | 3.2 |
| Example 24 | ○○ | Δ | 950 | 47 | 66 | 11.8 | 15 | 20.4 | 250 | 4 | 2.4 |
| Example 25 | ○○ | Δ | 1050 | 46 | 67 | 12.1 | 15.3 | 20.9 | 265 | 3.8 | 2.6 |
| Example 26 | ○ | ○ | 870 | 51 | 63 | 11.1 | 13.7 | 19.9 | 245 | 4.4 | 2.2 |
| Example 27 | ○○ | Δ | 1120 | 38 | 70 | 6.2 | 11.8 | 16.2 | 150 | 2.4 | 10.5 |
| Example 28 | Δ | Δ | 700 | 68 | 55 | 7.5 | 12.9 | 17.3 | 125 | 2.2 | 17.8 |
| Example 29 | ○ | Δ | 1260 | 34 | 56 | 16.4 | 21 | 27 | 110 | 2.5 | 2.8 |
| Example 30 | ○○ | ○○ | 900 | 52 | 65 | 27.9 | 35.7 | 42.5 | 255 | 4.8 | 3.2 |
| Example 31 | ○○ | ○ | 1100 | 41 | 68 | 25.4 | 33.3 | 40.1 | 210 | 4 | 3.6 |
| Example 32 | ○○ | Δ | 1260 | 30 | 87 | 10.8 | 19.2 | 28.7 | 150 | 2.1 | 4.1 |
| Example 33 | ○○ | Δ | 1200 | 28 | 90 | 9.5 | 15.6 | 26 | 135 | 1.8 | 4.5 |
| Comparative Example 1 | X | ○○ | 500 | 10 | 55 | 1.8 | 2.7 | 3.4 | 70 | 1.8 | 6.5 |
| Comparative Example 2 | X | ○○ | 1000 | 5 | 60 | 11.5 | 14.3 | 20 | 95 | 2.1 | 10.1 |
| Comparative Example 3 | X | ○○ | 1200 | 5 | 65 | 9.8 | 12.8 | 19.6 | 90 | 2 | 8.5 |
| Comparative Example 4 | ○ | X | 1500 | 15 | 78 | 14.8 | 16.2 | 21.2 | 100 | 2.2 | 14.2 |

INDUSTRIAL APPLICABILITY

The present invention can provide an epoxy adhesive composition that is excellent in compatibility and storage stability, has high strength and excellent adhesiveness, is capable of reducing occurrence of warping or peeling when used for bonding different materials, and is also excellent in impact resistance after being cured.

The invention claimed is:

1. An epoxy adhesive composition comprising:
   a modified polyvinyl acetal resin having a constitutional unit with an acid-modified group; and
   an epoxy resin,
   the epoxy adhesive composition containing an organic solvent in an amount of 10.0% by weight or less and an amount of the epoxy resin of 45% by weight to 99.5% by weight,
   wherein a ratio between the number of the acid-modified groups contained in the modified polyvinyl acetal resin and the number of epoxy groups contained in the epoxy resin is 0.0005 to 0.5.

2. The epoxy adhesive composition according to claim 1, wherein the acid-modified group is a carboxyl group.

3. The epoxy adhesive composition according to claim 1, wherein the modified polyvinyl acetal resin has the constitutional unit with an acid-modified group in a side chain.

4. The epoxy adhesive composition according to claim 1, wherein the amount of the constitutional unit with an acid-modified group in the modified polyvinyl acetal resin is 0.01 to 5.0 mol %.

5. The epoxy adhesive composition according to claim 1, wherein the modified polyvinyl acetal resin has an acetal group content of 60 to 90 mol %.

6. The epoxy adhesive composition according to claim 1, wherein the modified polyvinyl acetal resin is an acetalized product of polyvinyl alcohol having an acid-modified group.

7. The epoxy adhesive composition according to claim 1, wherein the amount of the modified polyvinyl acetal resin is 0.5 to 50% by weight.

8. The epoxy adhesive composition according to claim 1, wherein the amount of the modified polyvinyl acetal resin is 10 to 30% by weight.

* * * * *